(12) United States Patent
Koehler et al.

(10) Patent No.: US 10,850,671 B2
(45) Date of Patent: Dec. 1, 2020

(54) APPARATUS AND STORAGE SYSTEM FOR STORING AN ARTICLE IN A MOTOR VEHICLE

(71) Applicant: FORD GLOBAL TECHNOLOGIES, LLC, Dearborn, MI (US)

(72) Inventors: Juergen Koehler, Cologne (DE); Linh Ngoc Doan, Belleville, MI (US); Bhavani Thota, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 16/262,415

(22) Filed: Jan. 30, 2019

(65) Prior Publication Data
US 2020/0238917 A1   Jul. 30, 2020

(51) Int. Cl.
*B60R 7/04*   (2006.01)
*B60R 7/06*   (2006.01)

(52) U.S. Cl.
CPC ............... *B60R 7/04* (2013.01); *B60R 7/043* (2013.01); *B60R 7/046* (2013.01); *B60R 7/06* (2013.01)

(58) Field of Classification Search
CPC .. B60R 7/04; B60R 7/046; B60R 7/06; B60N 3/105; B60N 3/106; B60N 3/108
USPC .............. 296/24.34, 24.4, 37.8, 37.12, 37.13
See application file for complete search history.

(56) References Cited

U.S. PATENT DOCUMENTS

| | | | |
|---|---|---|---|
| 6,116,672 A | 9/2000 | Cannon et al. | |
| 6,880,874 B1* | 4/2005 | Kallenberger | B60R 7/046 296/37.1 |
| 7,232,194 B2 | 6/2007 | Becke et al. | |
| 7,240,814 B2* | 7/2007 | Holmberg | B60R 7/005 220/529 |
| 8,480,151 B2 | 7/2013 | Gaudig et al. | |
| 9,162,627 B2 | 10/2015 | Greiner et al. | |
| 9,616,817 B2* | 4/2017 | Dyle | B60N 3/102 |
| 2011/0074173 A1* | 3/2011 | Gaudig | B60N 3/108 296/24.34 |
| 2015/0217667 A1* | 8/2015 | Senda | B60N 2/78 296/37.8 |
| 2016/0052455 A1* | 2/2016 | Xu | B60N 2/793 296/37.8 |
| 2016/0090047 A1* | 3/2016 | Huebner | B60R 11/0252 296/24.34 |

(Continued)

FOREIGN PATENT DOCUMENTS

| | | |
|---|---|---|
| DE | 102010052827 A1 | 5/2012 |
| DE | 102012011207 A1 | 12/2013 |

OTHER PUBLICATIONS

English Machine Translation of DE102010052827A1 dated May 31, 2012.

(Continued)

*Primary Examiner* — Jason S Daniels
(74) *Attorney, Agent, or Firm* — David Coppiellie; King & Schickli, PLLC

(57) ABSTRACT

An apparatus is provided for holding an article in a motor vehicle. That apparatus includes a motor vehicle storage compartment having a receiver and a reversible insert held in the receiver. A storage system is also disclosed including a left-hand storage compartment including a first receiver, a right-hand storage compartment including a second receiver and a reversible insert configured for receipt in the first receiver and the second receiver.

15 Claims, 17 Drawing Sheets

(56) References Cited

U.S. PATENT DOCUMENTS

2020/0172293 A1* 6/2020 Leifheit ................ B65D 25/04

OTHER PUBLICATIONS

English Machine Translation of DE102012011207A1 dated Dec. 12, 2013.

\* cited by examiner

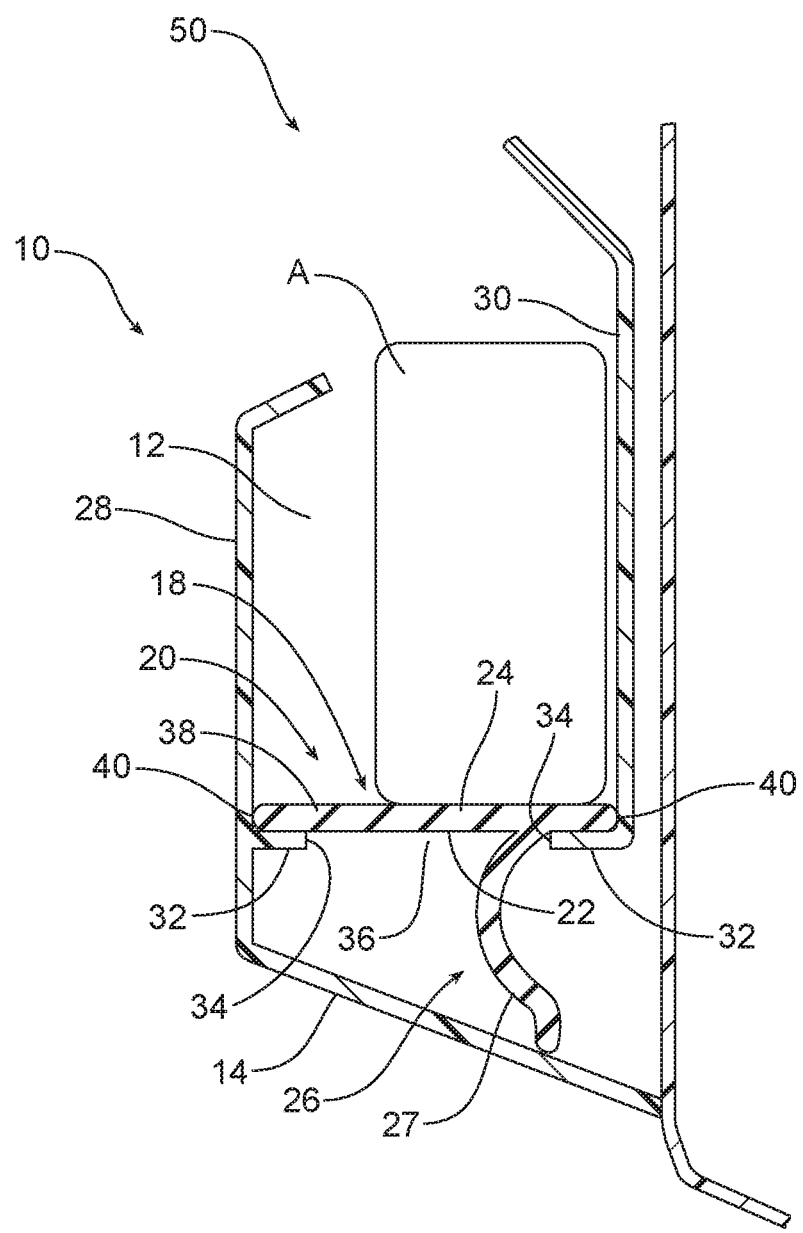

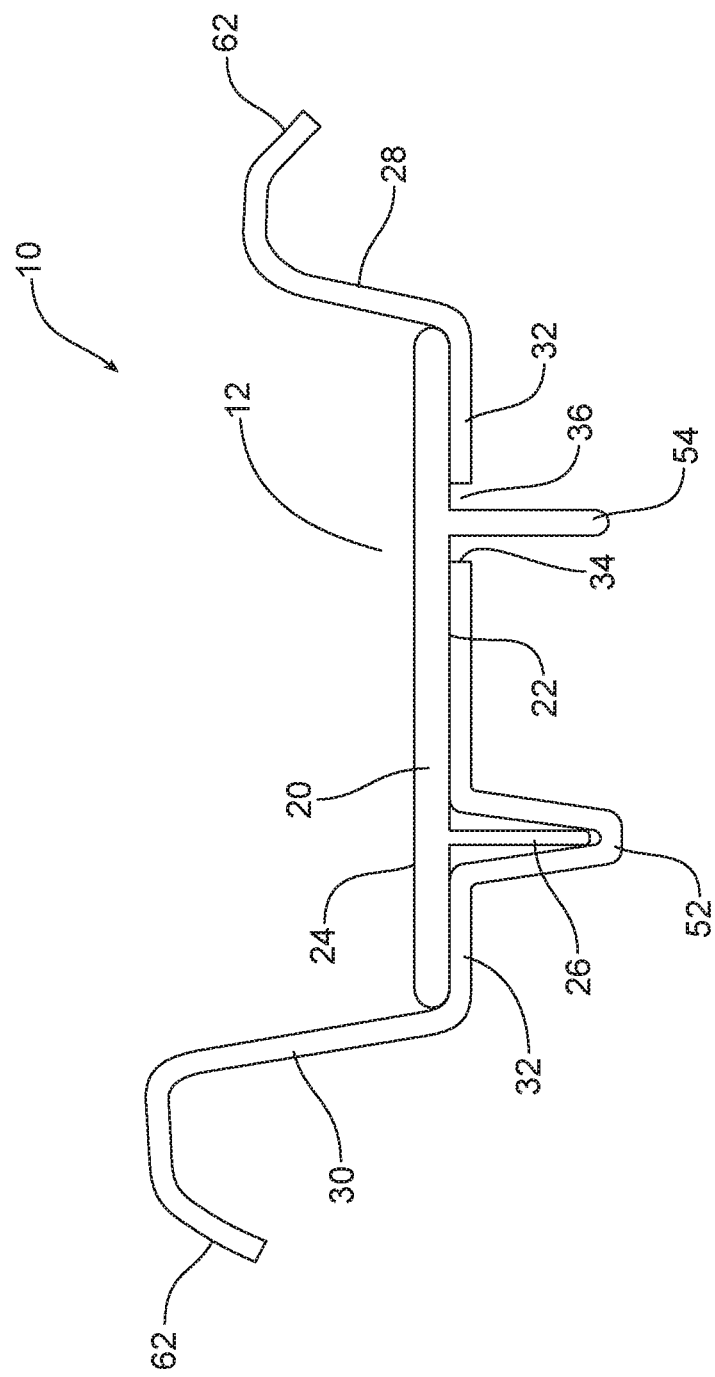

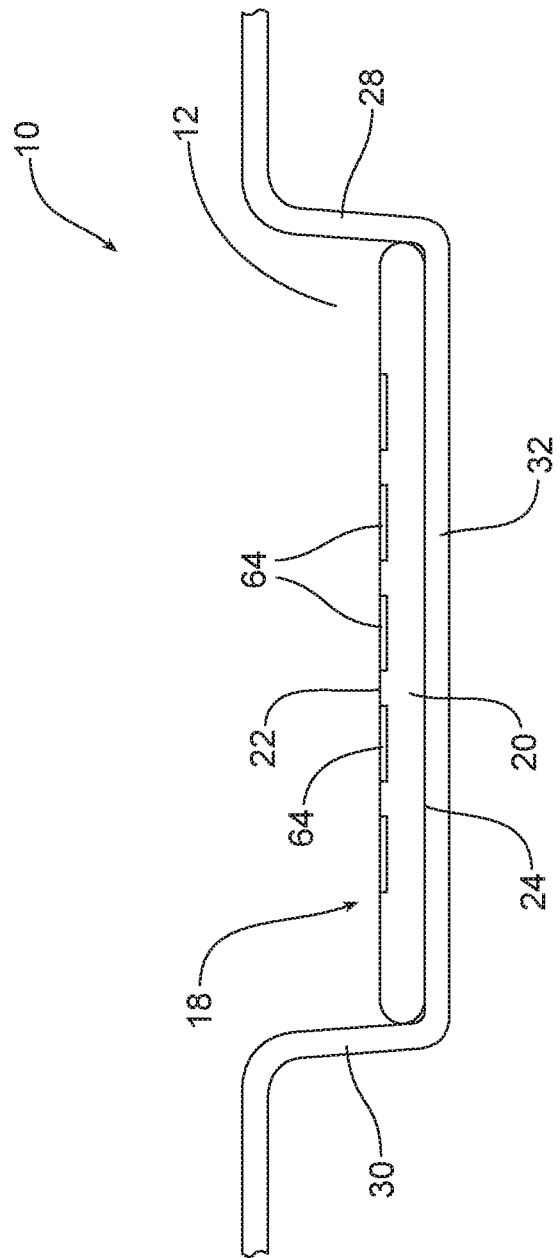

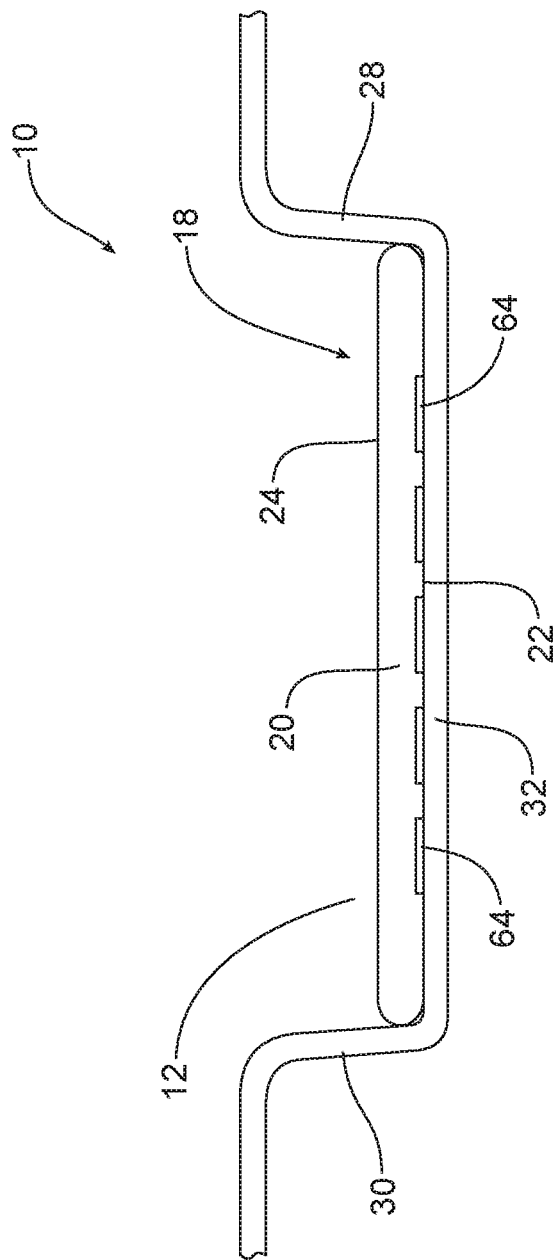

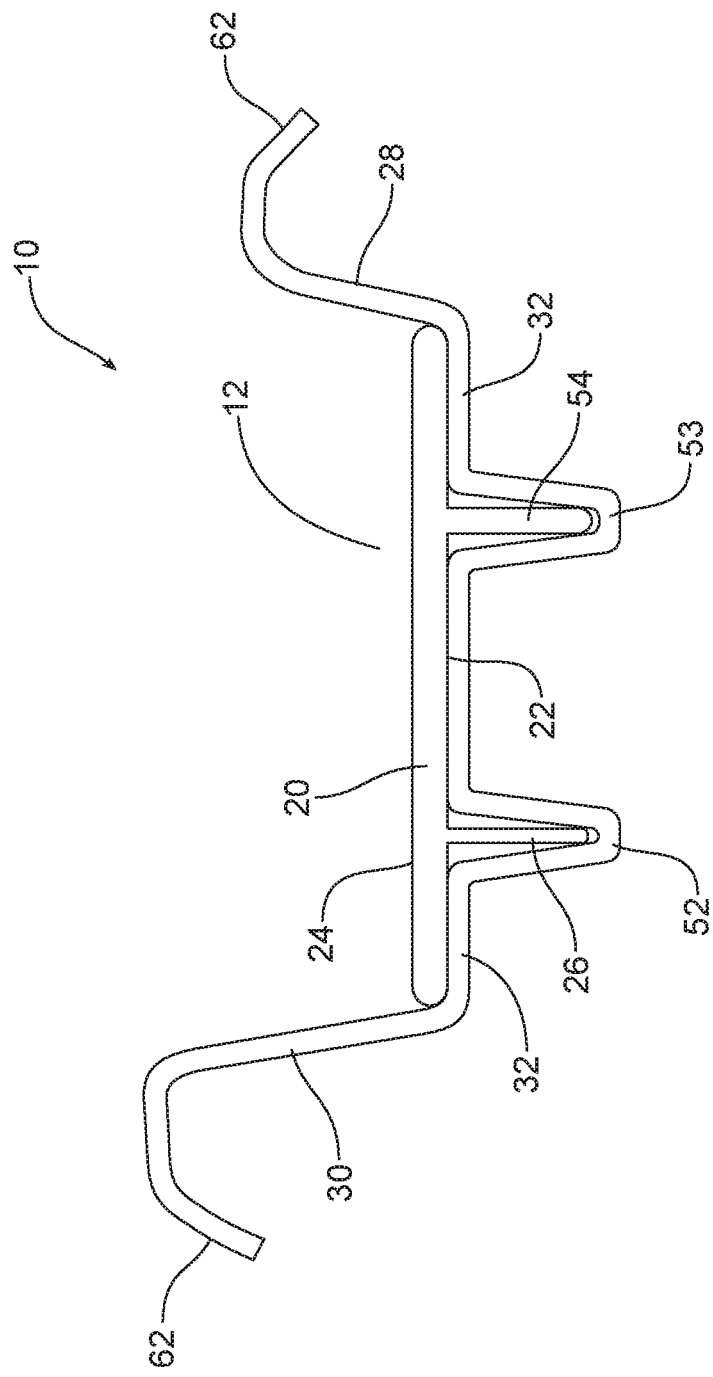

US 10,850,671 B2

APPARATUS AND STORAGE SYSTEM FOR STORING AN ARTICLE IN A MOTOR VEHICLE

TECHNICAL FIELD

This document relates to the motor vehicle equipment field and, more particularly, to a new and improved apparatus and storage system for storing an article in a motor vehicle.

BACKGROUND

Motor vehicle users have a strong interest in interior compartment storage that is both easily accessible and configurable to store a wide ranging variety of articles and items which may need to be carried and transported in a motor vehicle. Unfortunately, door panel storage cups, map pocket bins, floor console bins, dashboard bins and the like in state-of-the-art motor vehicles are generally of fixed storage design with no configurable capability. This limits motor vehicle users from being able to store items to meet their needs on a daily basis.

This document relates to a new and improved apparatus and storage system for motor vehicles that is readily configurable by the user and therefore adaptable to carry a wide variety of articles and items for the benefit of the motor vehicle user.

SUMMARY

In accordance with the purposes and benefits described herein, a new and improved apparatus is provided for holding and carrying various types and varieties of articles and items in a motor vehicle. That apparatus comprises a motor vehicle storage compartment having a receiver and a reversible insert held in that receiver.

That reversible insert may have (a) a first face and (b) a second face opposite the first face wherein the second face differs from the first face. More particularly, the first face and the second face have different configurations adapted for carrying different types and varieties of articles or items.

In one of the many possible embodiments of the apparatus, the first face includes a first partition. That first partition may comprise a resilient curved rib. In other of the many possible embodiments, the first face may also include a second partition. That second partition may be spaced from the first partition. Further, that second partition may extend parallel to the first partition.

The storage compartment may include a first sidewall, a second sidewall and a bottom wall. The receiver may be defined by the first sidewall, the second sidewall and the bottom wall. The bottom wall may include a first closed depression. As noted above, the first face may include a first partition and the first partition may be received and held in the first closed depression when the reversible insert is in a first orientation in the receiver.

The bottom wall may include a second closed depression and, as noted above, the first face may include a second partition that is received in the second closed depression when the reversible insert is in the first orientation in the receiver.

In one or more of the many possible embodiments, the bottom wall may include a margin defining a slot. The first face may include at least one partition and the at least one partition may be held in the slot defined by the margin when the reversible insert is in a first orientation in the receiver.

In one or more of the many possible embodiments of the apparatus, the motor vehicle storage compartment may be provided in a door trim panel. In one or more of the many possible embodiments of the apparatus, the motor vehicle storage compartment may be provided in a sidewall trim panel. In one or more of the many possible embodiments of the apparatus, the motor vehicle storage compartment may be provided in a floor console. In one or more of the many possible embodiments of the apparatus, the motor vehicle storage compartment may be provided in a dashboard.

In accordance with an additional aspect, a storage system may be provided for a motor vehicle. That storage system comprises a left-hand storage compartment including a first receiver, a right-hand storage compartment including a second receiver and a reversible insert configured for receipt in the first receiver and the second receiver. That reversible insert may have (a) a first face and (b) a second face opposite the first face wherein the second face differs from the first face. More particularly, the first and second faces may be uniquely configured to receive and hold various types and shapes of articles or items being transported by the motor vehicle user.

In the following description, there are shown and described several preferred embodiments of the apparatus and the storage system. As it should be realized, the apparatus and storage system are capable of other, different embodiments and their several details are capable of modification in various, obvious aspects all without departing from the apparatus and storage system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and the storage system and together with the description serve to explain certain principles thereof.

FIG. 2B is a view similar to FIG. 2A but illustrating a right-hand storage compartment in the form of a map pocket in the left-side door of the motor vehicle also illustrating the reversible insert in a first orientation.

Figure 4B:
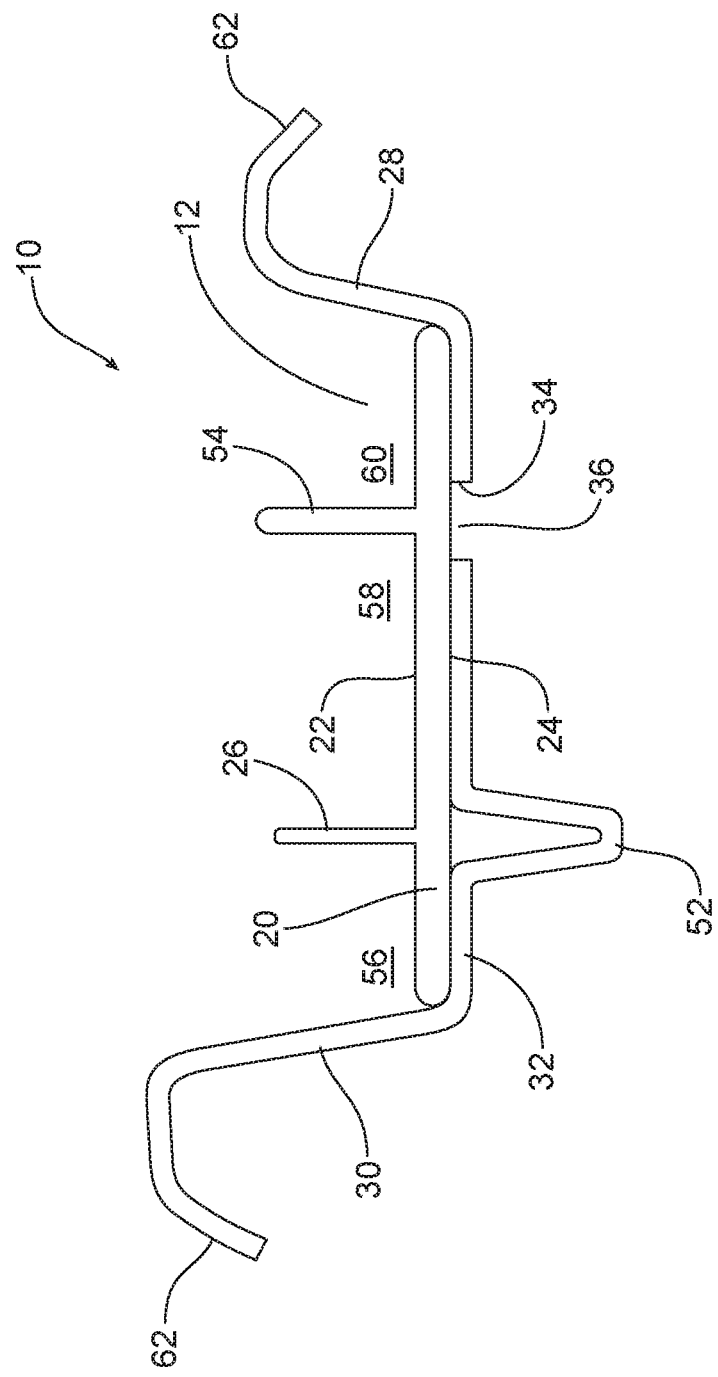

FIG. 4A is a schematic cross section illustration of an additional embodiment of the apparatus wherein the motor vehicle storage compartment includes a closed depression and an open slot and the reversible insert includes two partitions. FIG. 4B is a view similar to FIG. 4A. In FIG. 4A the insert is illustrated in a first orientation while in FIG. 4B the insert is illustrated in a second orientation.

FIGS. 5A and 5B illustrate yet another possible embodiment of the apparatus wherein the motor vehicle storage compartment is a floor console. In FIG. 5A the reversible insert is illustrated in a first orientation while in FIG. 5B the reversible insert is illustrated in a second orientation.

Figure 6A:
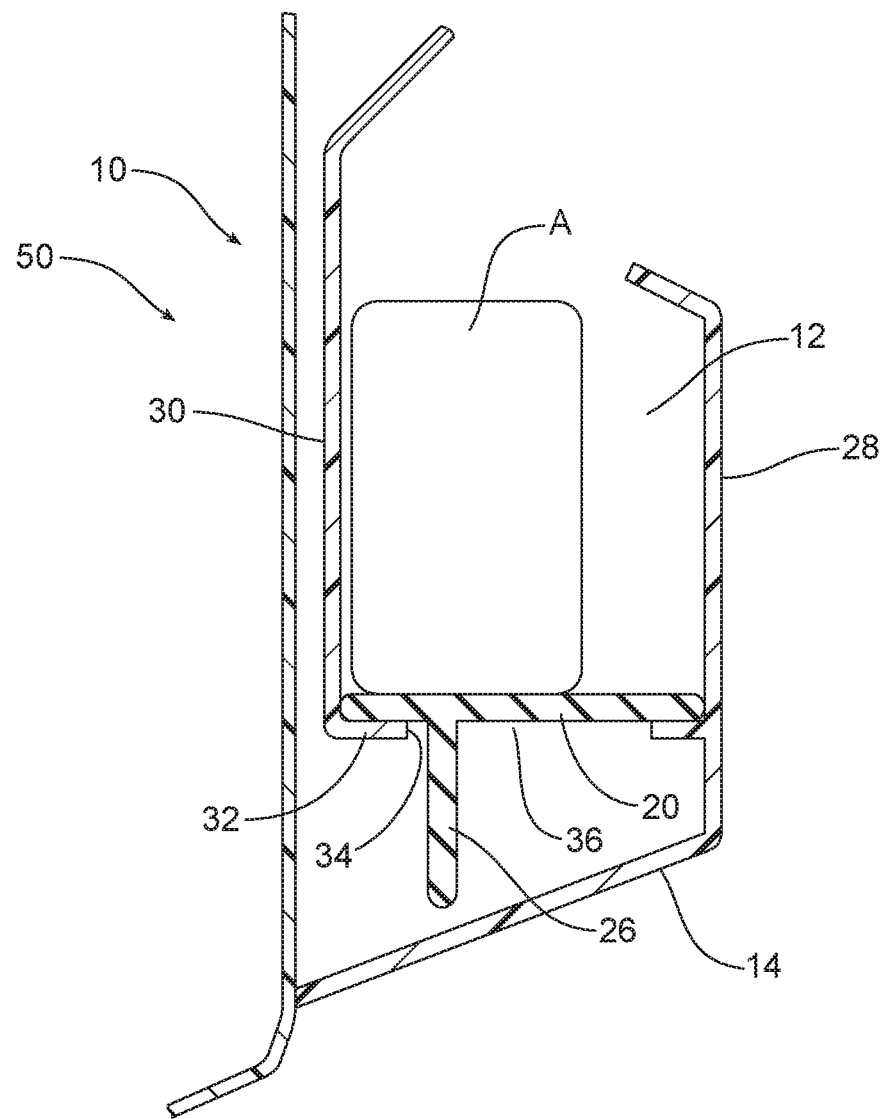
Figure 6B:
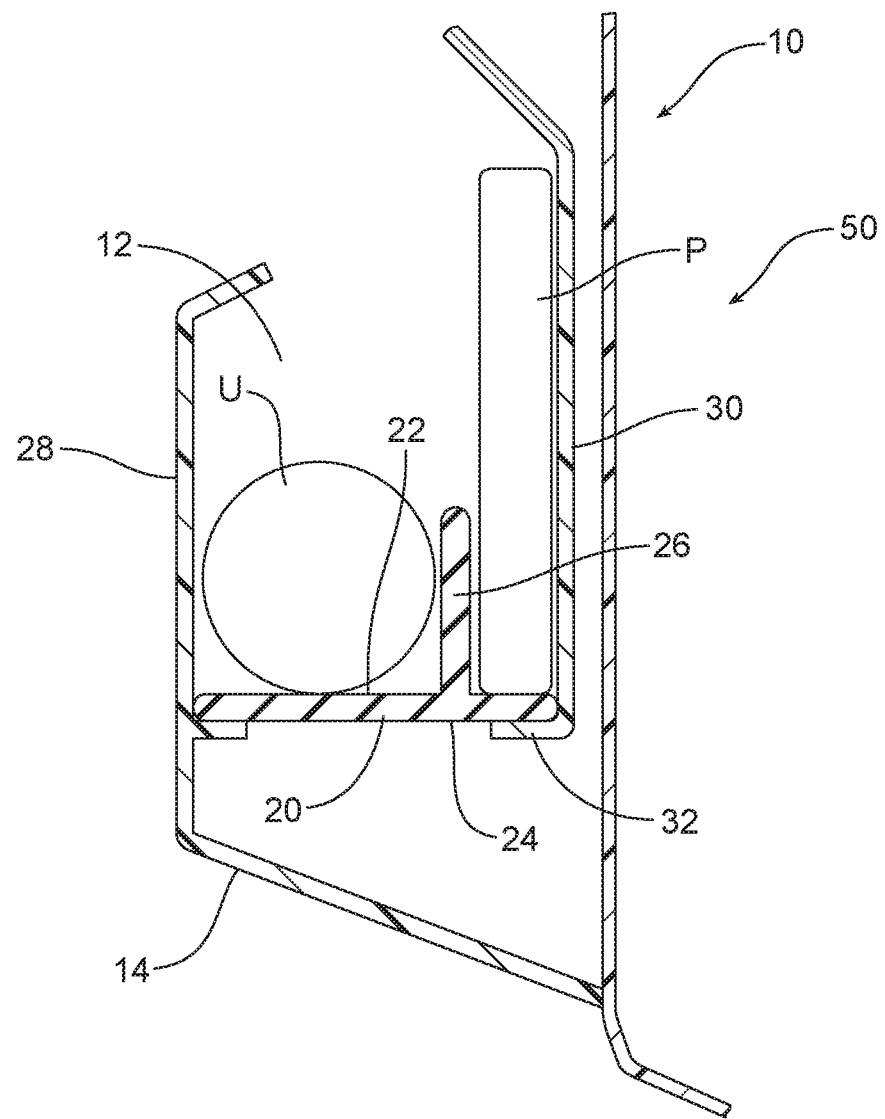

FIGS. 6A and 6B illustrate yet another possible embodiment of the apparatus wherein the motor vehicle storage compartment is provided in a sidewall trim panel. FIG. 6A illustrates a storage compartment in a left side sidewall trim panel with the insert in a first orientation while FIG. 6B illustrates the storage compartment in a right-side sidewall trim panel with the reversible insert in a second orientation.

FIG. 7 illustrates yet another possible embodiment wherein the bottom wall of the storage compartment includes two closed depressions.

Reference will now be made in detail to the present preferred embodiments of the apparatus and the storage system, examples of which are illustrated in the accompanying drawing figures.

DETAILED DESCRIPTION

Figure 1A:
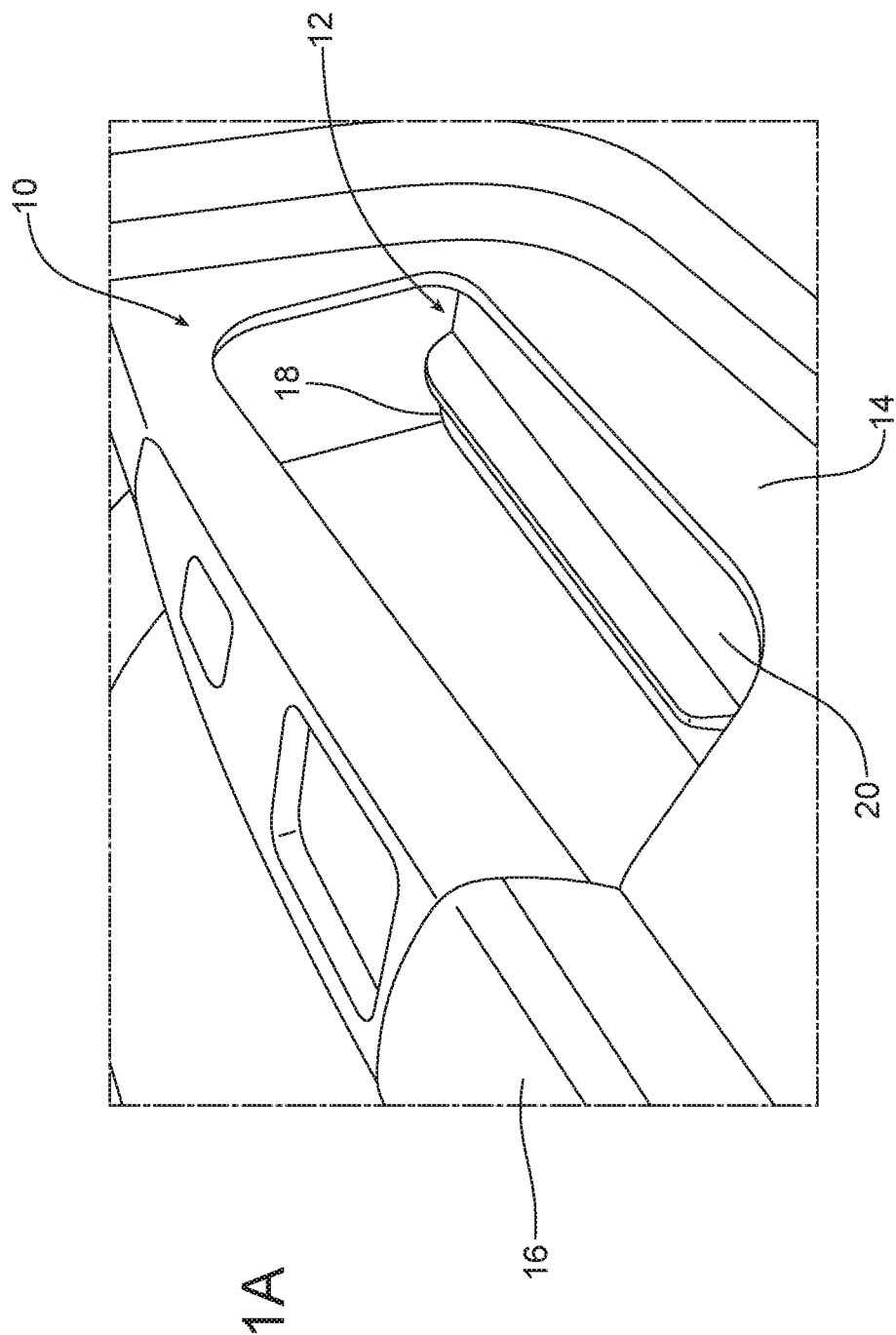
FIG. 1A is perspective view of a first possible embodiment of the apparatus illustrated as a map pocket provided in a door trim panel of a motor vehicle.

Reference is now made to FIG. 1A illustrating a first possible embodiment of the apparatus 10. As illustrated in FIG. 1A, the apparatus 10 includes a motor vehicle storage compartment 12 in the form of a map pocket, provided in a door trim panel 14 on a door 16 of a motor vehicle. The bottom of the storage compartment 12 includes a receiver 18 adapted to receive and hold a reversible insert 20 of the type illustrated in FIG. 2.

Figure 1B:
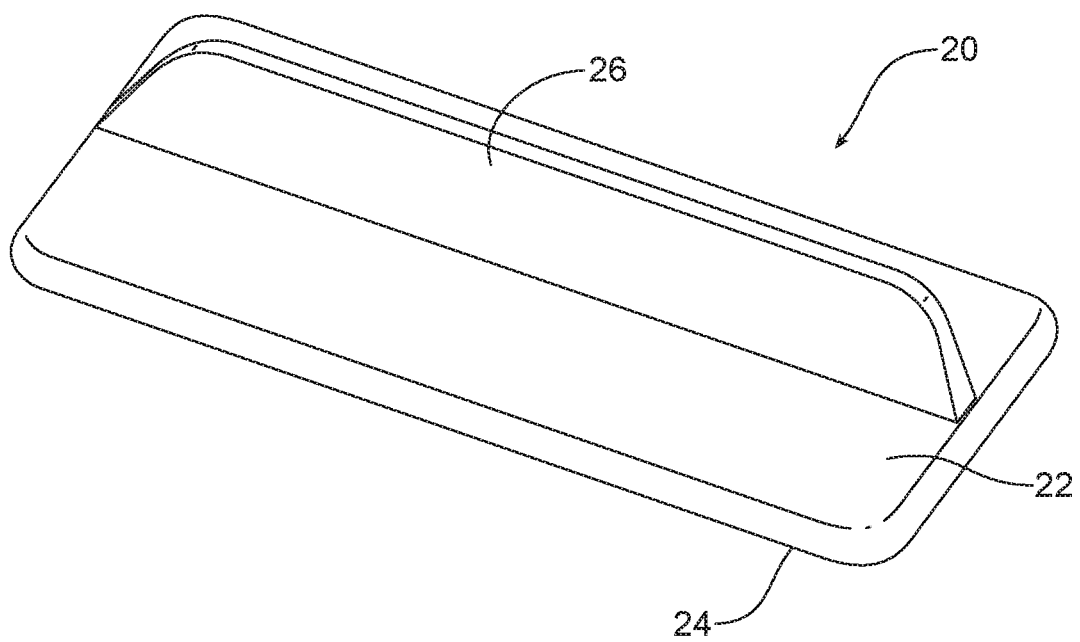
FIG. 1B is a detailed perspective view of a first possible embodiment of a reversible insert of a type held in a motor vehicle storage compartment of the apparatus.

As illustrated in FIG. 2, the reversible insert 20 has a first face 22 and a second face 24 opposite the first face. In the illustrated embodiment, the first face 22 differs from the second face 24. More particularly, in the embodiment illustrated in FIG. 1B, the first face 22 includes a first partition 26. In the embodiment illustrated in FIG. 2A, that first partition 26 comprises a resilient curved rib 27.

Figure 2A:
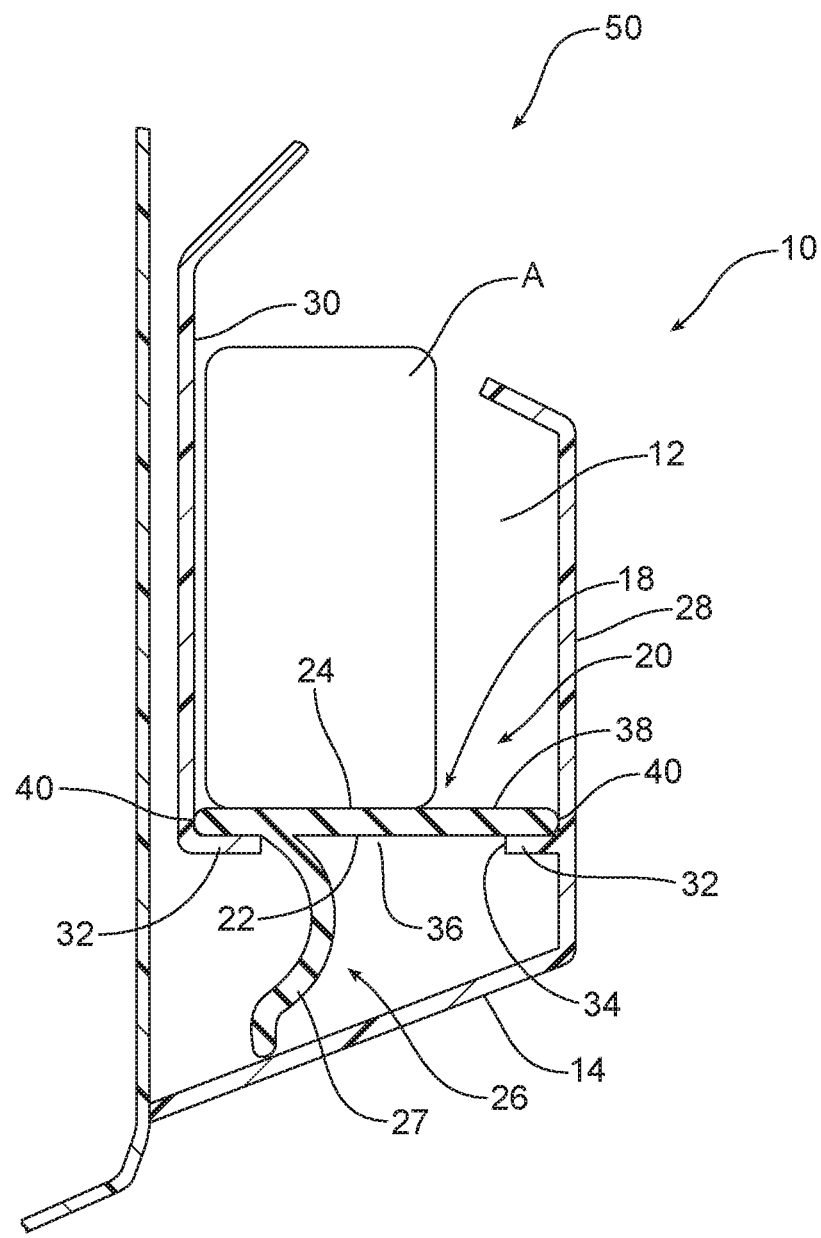
FIG. 2A is a schematic illustration of the apparatus wherein the motor vehicle storage compartment is a left-hand storage compartment or map pocket in a left-side door of a motor vehicle and the reversible insert is illustrated in a first orientation in the receiver of that storage compartment.

As further illustrated in FIG. 2A, the storage compartment 12 includes a first sidewall 28, a second sidewall 30 and a bottom wall 32. In the embodiment illustrated in FIG. 2A, the bottom wall 32 includes a margin 34 defining a slot 36. When the reversible insert 20 is in the first orientation illustrated in FIG. 2A, the first partition 26 is received in and extends through the slot 36 with the base 38 of the insert 20 resting on the bottom wall 32.

In the embodiment illustrated in FIG. 2A, the first sidewall 28, second sidewall 30 and bottom wall 32 of the storage compartment 12 are formed as an integral part of the door trim panel 14. When the reversible insert 20 is in the first orientation illustrated in FIG. 2A, it is hidden from view by the first sidewall 28 of the door trim panel 14.

As further illustrated in FIG. 2A, the first sidewall 28 and the second sidewall 30 of the storage compartment 12 abut the opposed edges 40 of the base 38 of the reversible insert 20 and thereby help hold the reversible insert in position so as to prevent rattling during motor vehicle operation over uneven pavement or rough roads.

In the embodiment of the apparatus 10 illustrated in FIG. 2A, the second face 24 of the reversible insert 20 is a flat feature free surface. Accordingly, when the reversible insert 20 is in the first orientation illustrated in FIG. 2A, the reversible insert 20 is adapted to receive a relatively large article or item A as shown.

As should be appreciated, in FIG. 2A, the storage compartment 12 is a left-hand storage compartment provided in a left-side door trim panel 14 of a motor vehicle. FIG. 2B illustrates an identical configuration except for the fact that the storage compartment 12 is a right-hand storage compartment in a right-side door trim panel 14. Like structures appearing in FIG. 2B are identified by identical reference numbers as those shown and described in FIG. 2A. Here it is significant to note that the reversible insert 20 in each of FIGS. 2A and 2B is identical. Thus, it should be appreciated that the reversible insert 20 is configured for receipt in the first receiver 18 in the left-hand storage compartment and the second receiver 18 in the right hand storage compartment. So one insert 20 is configured to fit receivers 18 on both sides of the motor vehicle. This reduces production costs and part inventories.

Figure 2C:
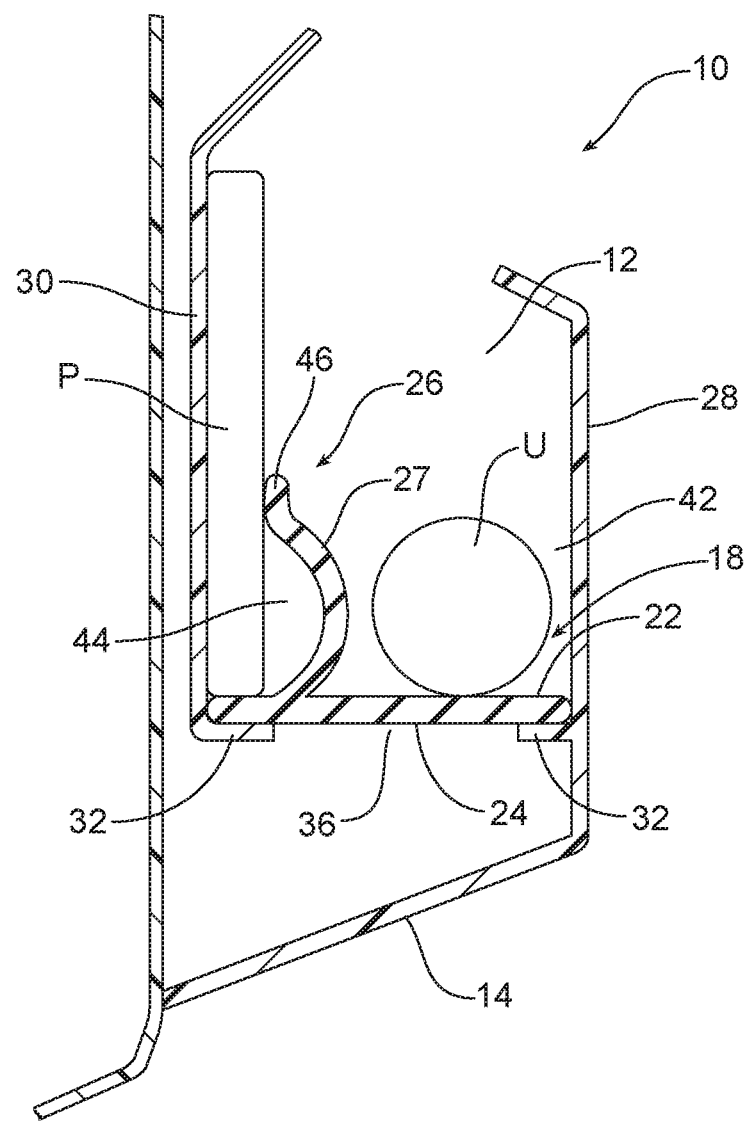
FIGS. 2C and 2D are illustrations similar to FIGS. 2A and 2B except that they show the reversible insert in a second orientation.
Figure 2D:
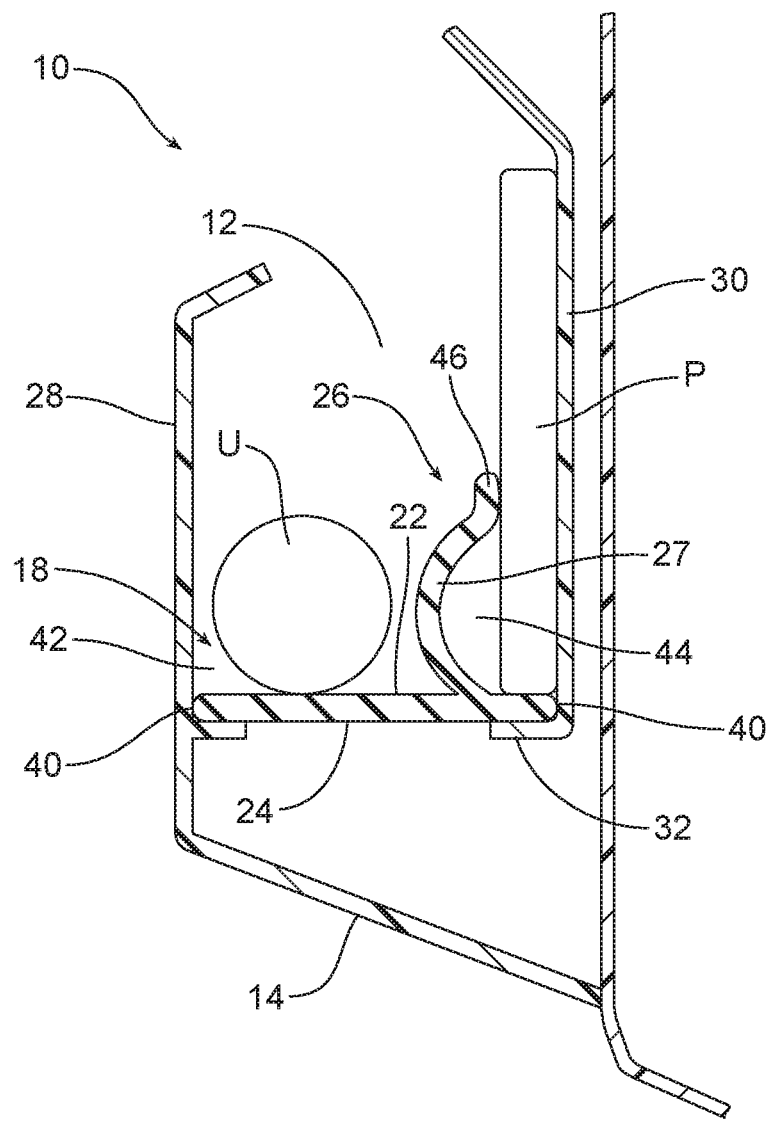

FIGS. 2C and 2D illustrate the respective left-hand and right-hand storage compartments 12 with the reversible insert 20 in a second orientation: that is with the first face 22 oriented upward. In this orientation the first partition 26 projects upwardly into the storage compartment 12 between the first sidewall 28 and the second sidewall 30 thereby partitioning that storage compartment into a first section or chamber 42 formed between the first partition 26 and the first sidewall 28 and a second section or chamber 44 formed between the first partition and the second sidewall 30. As illustrated in FIGS. 2C and 2D, the first chamber 42 holds a small bottle or umbrella U while the second chamber 44 holds a smart phone P. As should be appreciated, the first partition 26 may be resilient and include a distal end 46 adapted to engage and lightly press the smart phone P against the second sidewall 30 thereby positively holding it in position against displacement as the motor vehicle is accelerating, decelerating, or transitioning through a corner.

Figure 2E:
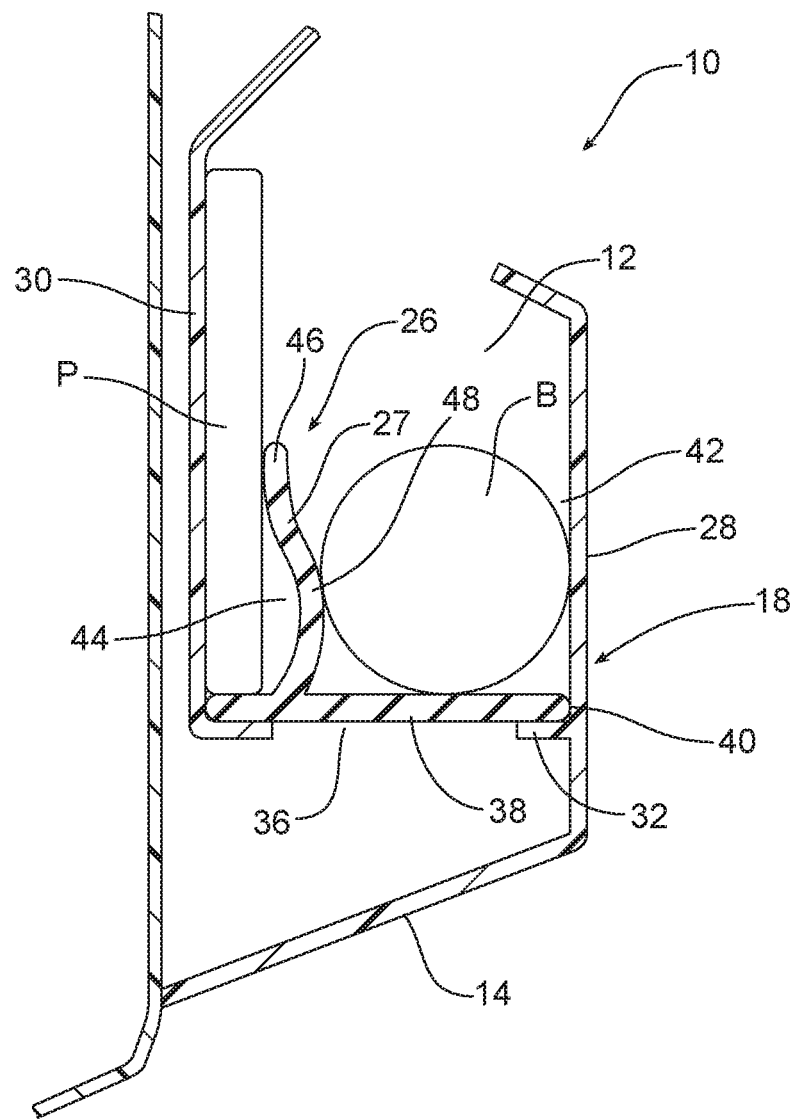
FIGS. 2E and 2F are similar to FIGS. 2C and 2D except for the size of the item carried on one side of the resilient curved rib of the reversible insert.
Figure 2F:
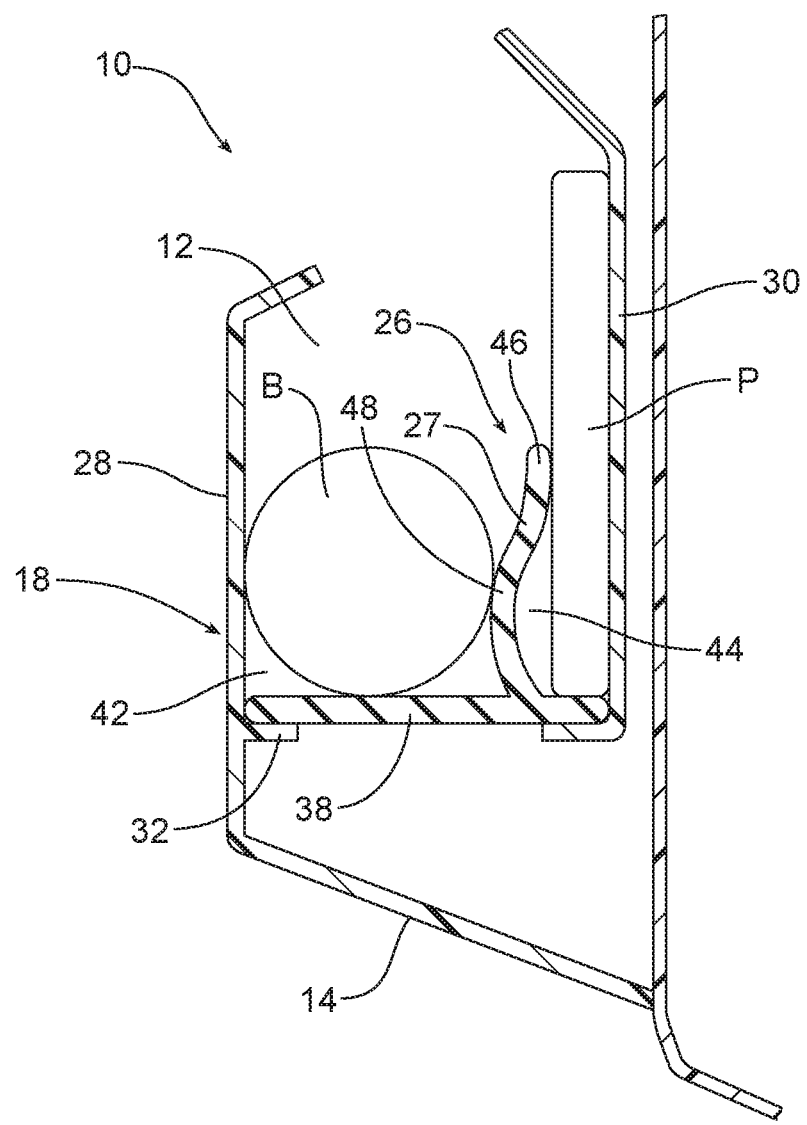

FIGS. 2E and 2F are similar to FIGS. 2C and 2D except the first chamber 42 now holds a larger item such as the water bottle B. As illustrated the water bottle B is sufficiently large to engage and deflect the bulbous intermediate portion 48 of the first partition 26. Advantageously, the resilient material of the first partition 26 provides a biasing force against the bottle B thereby positively securing the bottle B in position in the first chamber 42 by pressing the bottle against the first sidewall 28 where it is held in place against any acceleration, deceleration and cornering forces to which the bottle is subjected while the motor vehicle is being driven. At the same time, the distal end 46 maintains a biasing force pressing the smart phone P against the wall 30 thereby also positively holding the smart phone in place.

The left-hand storage compartment 12 including the first receiver 18 illustrated in FIG. 2A and the right-hand storage compartment 12 including the second receiver 18 illustrated in FIG. 2B in combination with the identical reversible inserts 20 illustrated in the drawing FIGS. 2A and 2B define a new and improved storage system 50 for a motor vehicle. As noted above, each reversible insert 20 is configured for receipt in either of the receivers 18 illustrated in drawing FIGS. 2A and 2B.

Figure 3A:
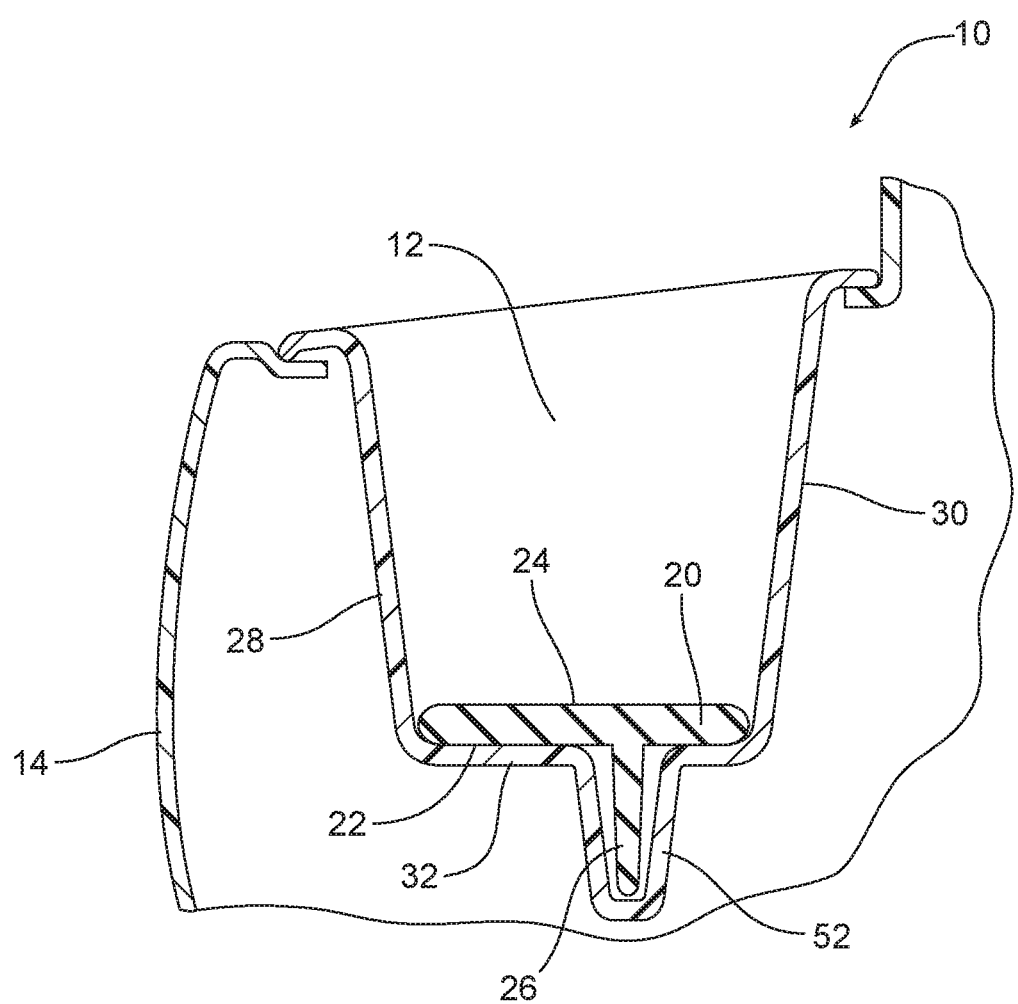
FIG. 3A is a schematic cross sectional view of an additional embodiment of the apparatus wherein the motor vehicle storage compartment is a door trim panel pull-cup and the reversible insert is illustrated in a first orientation.
Figure 3B:
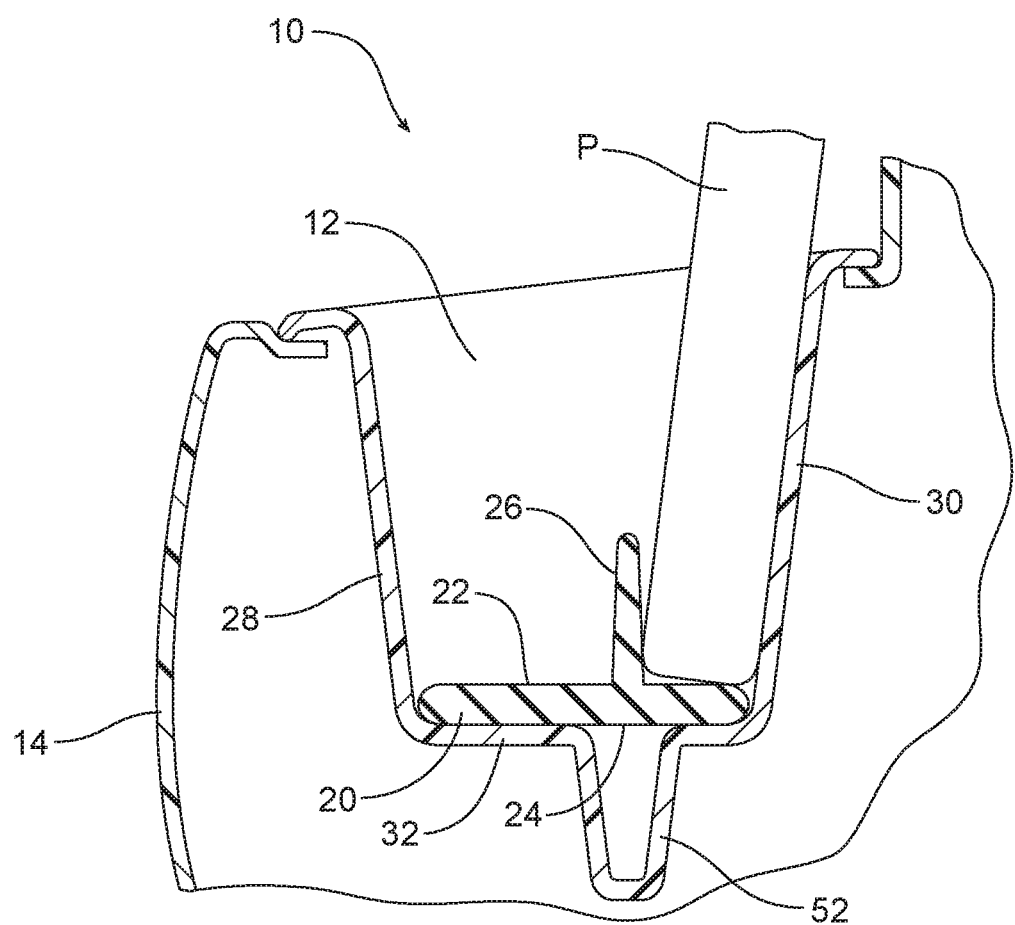
FIG. 3B is a view similar to FIG. 3A but illustrating the reversible insert in a second orientation.

Reference is now made to FIGS. 3A and 3B illustrating an alternative embodiment of the apparatus 10 wherein the motor vehicle storage compartment 12 comprises a door trim panel pull-cup received and held in a door trim panel 14. More particularly, the storage compartment 12 illustrated in FIGS. 3A and 3B again includes a first sidewall 28, a second sidewall 30 and a bottom wall 32. In this embodiment, the bottom wall 32 includes a first closed depression 52. The reversible insert 20 again includes a first face 22 having a first partition 26 and a second, opposite face 24 differing in configuration from the first face.

In FIG. 3A, the reversible insert 20 is in a first orientation with the first face 22 oriented downwardly and the first partition 26 being received and held in the first closed depression 52. In FIG. 3B, the reversible insert 20 is in a second orientation with the first face 22 oriented upwardly and the first partition 26 projecting upwardly between the first and second sidewalls 28, 30 of the storage compartment 12. A smart phone P is illustrated as being captured in between the partition 26 and the second sidewall 30 where it is held in place from shifting during operation of the motor vehicle.

FIGS. 4A and 4B illustrate yet another possible embodiment of the apparatus 10 including a storage compartment 12 and a reversible insert 20. In this embodiment, the first face 22 of the reversible insert 20 includes a first partition 26 and a second partition 54. As illustrated, the second partition 54 is spaced from and parallel to the first partition 26. Other structural geometries are possible.

The storage compartment 12 includes a first sidewall 28, a second sidewall 30 and a bottom wall 32. As illustrated in FIGS. 4A and 4B, the bottom wall 32 includes a first closed depression 52 and a first slot 36 defined by a margin 34 of the bottom wall.

As illustrated in FIG. 4A, when the reversible insert 20 is in the first orientation with the first face 22 oriented downward juxtaposed to the bottom wall 32, the first partition 26 is received and held in the first closed depression 52 while the second partition 54 is received in the first slot 36. In this orientation the second face 24 of the reversible insert 20 is oriented upward providing a flat, open surface for receiving and holding any article within the storage compartment.

In contrast, as illustrated in FIG. 4B, when the reversible insert 20 is turned over and provided in a second orientation, the first partition 26 and the second partition 54 project upwardly into the storage compartment 12 between the first and second sidewalls 28, 30 thereby effectively partitioning the compartment into three sections or chambers 56, 58, 60. In either orientation of the reversible insert 20, the reversible insert fits snug in the receiver 18 formed by the storage compartment 12 resting on the bottom wall 32 and secured between the first and second sidewalls 28, 30. The storage compartment 12 illustrated in FIGS. 4A and 4B may be provided in a door trim panel, a sidewall trim panel, a floor console or even a dashboard all schematically illustrated at reference numeral 62.

Reference is now made to FIGS. 5A and 5B illustrating yet another possible embodiment of the apparatus 10 including a storage compartment 12 and a reversible insert 20. In this embodiment, the storage compartment 12 once again includes a first sidewall 28, a second sidewall 30 and a bottom wall 32 that define a receiver 18. The reversible insert 20 includes a first face 22 incorporating a pictograph, logo or other decorative indicia 64 while the second face 24 is plain. In FIG. 5A, the reversible insert 20 is in a first orientation with the first face 22 oriented upward and the pictograph or indicia 64 visible at the bottom of the storage compartment 12. In contrast, in FIG. 5B the reversible insert 20 has been reoriented into a second orientation with the first face oriented downward toward the bottom wall 32 so that the pictograph or indicia 64 is hidden.

Reference is now made to FIGS. 6A and 6B illustrating respective left-hand and right-hand storage compartments 12 provided in respective left-side and right-side sidewall trim panels 14 of a motor vehicle.

The reversible insert 20 provided in each of the left-hand and right-hand storage compartments 12 is of identical construction. In FIG. 6A, the reversible insert 20 held in the receiver 18 of the left-hand storage compartment 12 is provided in a first orientation with the first face 22 facing downward and the first partition 26 received and held in the slot 36 provided in the bottom wall 32. A relatively large rectangular-shaped article A is held in the storage compartment 12 illustrated in FIG. 6A.

In contrast, the right-hand storage compartment 12 illustrated in FIG. 6B includes a reversible insert 20 in a second orientation with the second face 24 facing upward and the first partition 26 projecting upward into the storage compartment between the first sidewall 28 and the second sidewall 30. An umbrella U is held in the storage compartment 12 between the first partition 26 and the first sidewall 28 while a smart phone P is held in the storage compartment between the first partition 26 and the second sidewall 30. Together, the two storage compartments 12 and the two reversible inserts 20 received therein define a storage system 50.

The foregoing has been presented for purposes of illustration and description. It is not intended to be exhaustive or to limit the embodiments to the precise form disclosed. Obvious modifications and variations are possible in light of the above teachings. For example, as illustrated in FIG. 7, the bottom wall 32 could include a first closed depression 52 and a second closed depression 53 to receive the first and second partitions 26, 54 when the reversible insert 20 is in the first orientation. Further, while the second face 24 of the reversible insert 20 in all of the illustrated embodiments is flat, it should be appreciated that the second face could also include one or more partitions in a configuration different than that provided for the first face 22. All such modifications and variations are within the scope of the appended claims when interpreted in accordance with the breadth to which they are fairly, legally and equitably entitled.

What is claimed:

1. An apparatus, comprising:
   a motor vehicle storage compartment having a receiver; and
   a reversible insert held in said receiver, said reversible insert having a first face and a second face opposite said first face wherein (a) said second face differs from said first face, (b) in a first orientation said reversible insert is held in said motor vehicle storage compartment with said first face down and (c) in a second orientation, said reversible insert is held in said motor vehicle storage compartment with said second face down.

2. The apparatus of claim 1, wherein said first face includes a first partition.

3. The apparatus of claim 2, wherein said first partition is a resilient curved rib.

4. The apparatus of claim 2, wherein said first face includes a second partition.

5. The apparatus of claim 4, wherein said second partition is spaced from said first partition.

6. The apparatus of claim 5, wherein said second partition extends parallel to said first partition.

7. The apparatus of claim 1, wherein said storage compartment includes a first sidewall, a second sidewall and a bottom wall.

8. The apparatus of claim 7, wherein said receiver is defined by said first sidewall, said second sidewall and said bottom wall.

9. The apparatus of claim 8, wherein said bottom wall includes a margin defining a slot and wherein said first face includes at least one partition and said at least one partition is held in said slot defined by said margin when said reversible insert is in the first orientation in said receiver.

10. The apparatus of claim 1, wherein said motor vehicle storage compartment is provided in a door trim panel.

11. The apparatus of claim 1, wherein said motor vehicle storage compartment is provided in a sidewall trim panel.

12. The apparatus of claim 1, wherein said motor vehicle storage compartment is provided in a floor console.

13. The apparatus of claim 1, wherein said motor vehicle storage compartment is provided in a dashboard.

14. An apparatus, comprising:
a motor vehicle storage compartment including a first side wall, a second side wall and a bottom wall defining a receiver; and
a reversible insert held in said receiver, said reversible insert having (a) a first face and (b) a second face opposite said first face wherein (a) said second face differs from said first face, (b) in a first orientation said reversible insert is held in said motor vehicle storage compartment with said first face down and (c) in a second orientation, said reversible insert is held in said motor vehicle storage compartment with said second face down and
wherein said bottom wall includes a first closed depression and said first face includes a first partition and said first partition is received and held in said first closed depression when said reversible insert is in the first orientation in said receiver.

15. The apparatus of claim 14, wherein said bottom wall includes a second closed depression and said first face includes a second partition that is received in said second closed depression when said reversible insert is in said first orientation in said receiver.

* * * * *